F. B. McDANIEL.
SAFETY AIR BRAKE DEVICE.
APPLICATION FILED OCT. 21, 1919.

1,379,459.

Patented May 24, 1921.
2 SHEETS—SHEET 1.

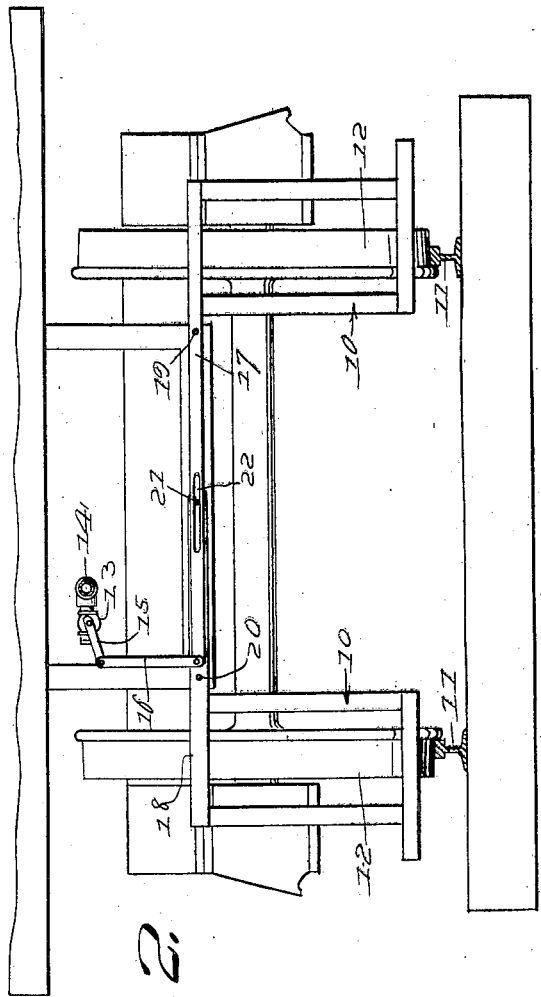
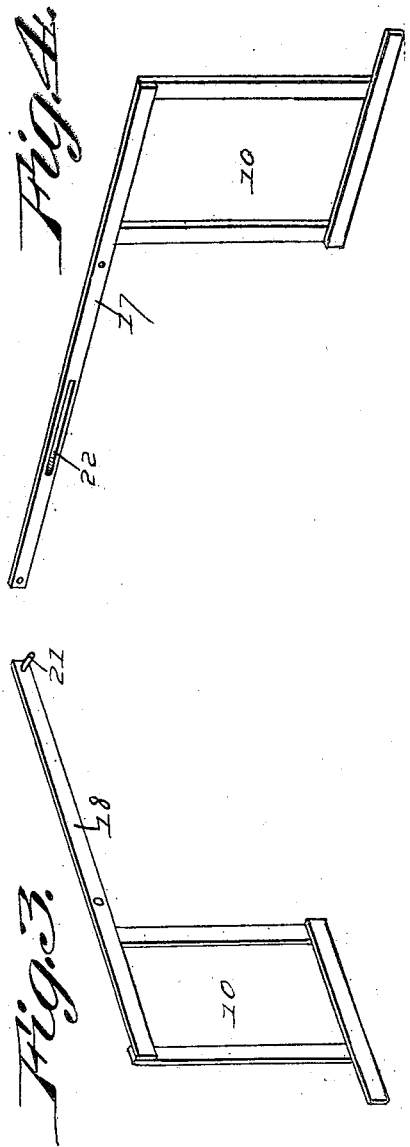

UNITED STATES PATENT OFFICE.

FLOYD B. McDANIEL, OF SALEM, VIRGINIA.

SAFETY AIR-BRAKE DEVICE.

1,379,459.

Specification of Letters Patent. Patented May 24, 1921.

Application filed October 21, 1919. Serial No. 332,264.

*To all whom it may concern:*

Be it known that I, FLOYD B. McDANIEL, a citizen of the United States of America, residing at Salem, in the county of Roanoke and State of Virginia, have invented new and useful Improvements in Safety Air-Brake Devices, of which the following is a specification.

The object of the invention is to provide simple means readily applicable to railway cars and similar vehicles employing air brake mechanism for automatically applying the brakes by the release or reduction of the train pipe pressure in the event of accident, such as derailment or the like, to the end that the increase of the damage incident to the immediate cause of the accident and resulting from the continued movement of the cars thereby may be avoided, and to this end the invention consists in a construction and combination of parts of which a preferred embodiment is illustrated in the accompanying drawing, wherein:

Fig. 2 is an end view of the car truck showing the apparatus in elevation, the plane of the view being indicated by the dotted line 2—2 of Fig. 1.

Figs. 3 and 4 are detail views in perspective of the shoes and the levers by which they are carried.

Figure 1:
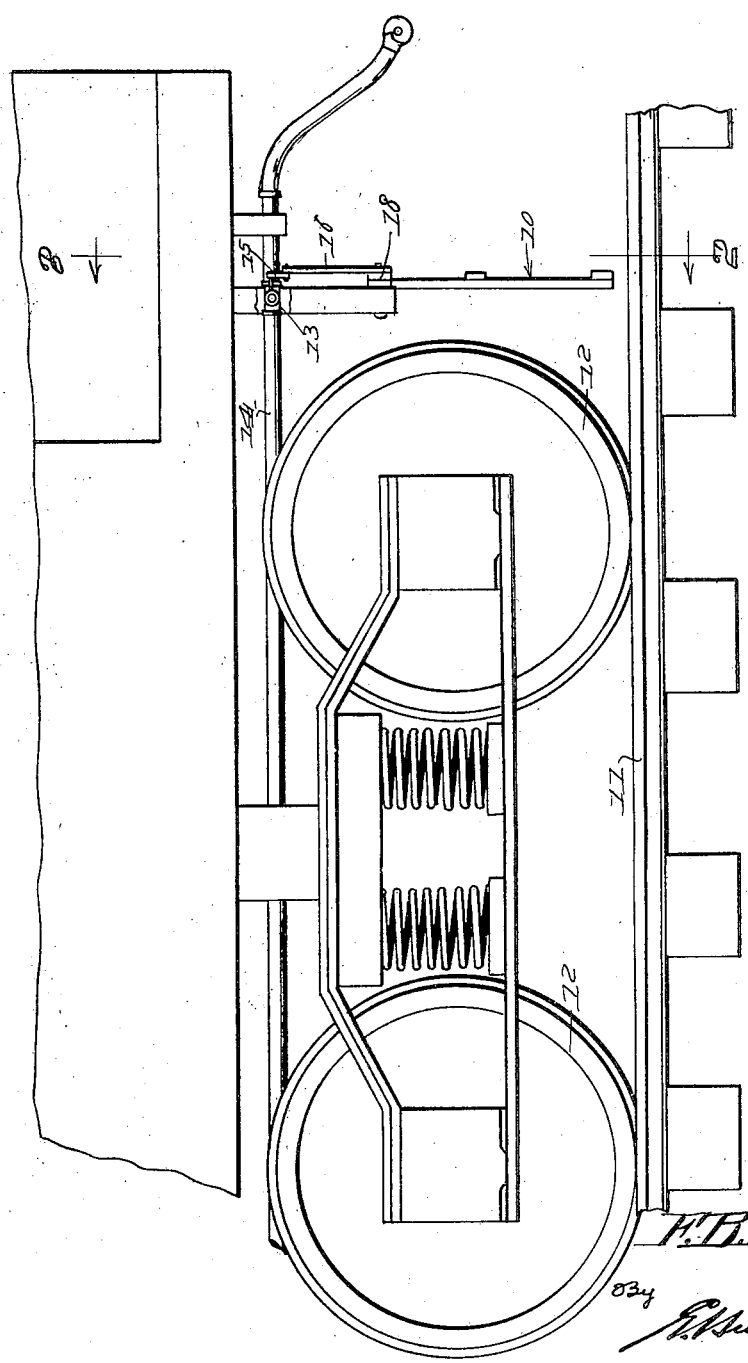
Figure 1 is a side view of a truck such as that usually employed at one end of a railway car, showing the safety device arranged in operative relation therewith.

The apparatus consists essentially of shoes 10 which may as illustrated be of open framework construction disposed in transverse planes relative to the track rails 11 and the wheels 12 of the truck of a railway car or other vehicle, preferably adjacent to the planes of the wheels and with their lower edges spaced only a few inches above the planes of the rail treads, so that in the event of derailment of the truck wheels the shoes will come in contact with the rail treads before the wheel treads encounter the ties upon which the rails are supported, to the end that an upward movement may be imparted to the shoes, suitable connections being provided between the shoes and a release valve 13 which is in communication with the air brake train pipe 14, to the end that the movement of the valve will cause a release or reduction of pressure in the train pipe and thus serve to immediately apply the brakes throughout the train.

Obviously the release or reduction valve may be of any preferred construction, preferably actuable through an arm 15 which is connected by a suitable link 16 with levers 17 and 18 which respectively support the shoes, are pivoted as indicated at 19 and 20 and are connected for simultaneous movement in a common direction as by a pin and slot joint consisting of a pin 21 on the lever 18 operating in a slot 22 in the lever 17.

The upward movement of a shoe by the contact thereof with the corresponding rail will thus serve to tilt both levers owing to their connection for simultaneous movement, and thus turn the valve to reduce pressure in the train pipe, and in this way the continued movement of the train upon the ties or road bed, with the consequent increase in the damage both to the rolling stock and the track, incident to the accident which has caused the derailment, will be minimized, particularly in connection with those wrecks wherein the conditions are such as to prevent the engineer from promptly applying the brakes, or, as frequently occurs, when the derailment happens with reference to a car at the rear or at an intermediate point of the train, and is not immediately known to the engineer.

What is claimed is:

In a safety device, the combination with a car having a train pipe release valve, of shoes consisting of open frames disposed in transverse planes relative to the car track and car wheels adjacent the planes of the latter and having their lower edges disposed slightly above the planes of the rail treads, the upper sides of the shoes being extended laterally to provide overlapping levers, one of which carries a laterally projecting pin and the other of which is formed with a longitudinal slot in which the said pin engages, an arm connected with the release valve for the operation thereof, and a link having one end pivotally connected to said arm and the other end pivotally connected to one of the lever extensions from said shoes.

In testimony whereof I affix my signature.

FLOYD B. McDANIEL.